US007595072B2

(12) United States Patent
Heeb et al.

(10) Patent No.: US 7,595,072 B2
(45) Date of Patent: Sep. 29, 2009

(54) PROCESS FOR WARM DEHULLING SOYA

(75) Inventors: Christian Heeb, Minnetonka, MN (US); Urs V. Keller, Plymouth, MN (US)

(73) Assignee: Buhler AG, Uzwil (CH)

( * ) Notice: Subject to any disclaimer, the term of this patent is extended or adjusted under 35 U.S.C. 154(b) by 660 days.

(21) Appl. No.: 11/008,987

(22) Filed: Dec. 13, 2004
(Under 37 CFR 1.47)

(65) Prior Publication Data
US 2005/0106299 A1    May 19, 2005

Related U.S. Application Data

(60) Division of application No. 10/374,060, filed on Feb. 27, 2002, now Pat. No. 7,021,572, and a continuation of application No. PCT/CH00/00461, filed on Aug. 30, 2000.

(51) Int. Cl.
*A23L 1/20* (2006.01)

(52) U.S. Cl. .................................. 426/482; 426/634

(58) Field of Classification Search ................. 426/634, 426/482
See application file for complete search history.

(56) References Cited

U.S. PATENT DOCUMENTS

| | | | |
|---|---|---|---|
| 1,923,200 A | 8/1933 | Hedberg | |
| 2,091,620 A * | 8/1937 | Williams | 209/443 |
| 2,355,728 A * | 8/1944 | Hyland | 222/231 |
| 2,952,540 A * | 9/1960 | Kruse | 426/630 |
| 3,220,451 A * | 11/1965 | Bollens et al. | 426/482 |
| 3,253,930 A * | 5/1966 | Gould et al. | 426/457 |
| 3,448,856 A | 6/1969 | Thompson | |
| 4,300,267 A * | 11/1981 | Winch et al. | 19/200 |
| 4,486,459 A * | 12/1984 | Thompson | 426/634 |
| 4,681,029 A * | 7/1987 | Bartesch et al. | 99/483 |
| 5,085,808 A * | 2/1992 | Snyder et al. | 554/12 |
| 5,100,062 A * | 3/1992 | Baltensperger et al. | 241/9 |
| 5,474,238 A | 12/1995 | Reichmuth | |
| 5,936,069 A * | 8/1999 | Johnson | 530/378 |

FOREIGN PATENT DOCUMENTS

| | | |
|---|---|---|
| DE | 35 44 387 C2 | 9/1993 |
| DE | 197 33 424 A1 | 2/1999 |
| EP | 33 59 25 B1 | 4/1989 |
| EP | 0 994 751 B1 | 7/1998 |
| WO | WO 02/17736 A1 | 3/2002 |

\* cited by examiner

*Primary Examiner*—Anthony Weier
(74) *Attorney, Agent, or Firm*—Buchanan Ingersoll & Rooney PC

(57) ABSTRACT

The invention relates to a method for warm dehulling soya and other bean fruits and for subsequently grinding them, as well as to corresponding installation. The invention can simplify the process and the design of the installation. To this end, the fruits and heated/conditioned, double-ground, individualized on a baffle plate and the hulls are removed.

5 Claims, 2 Drawing Sheets

PROCESS FOR WARM DEHULLING SOYA

CROSS-REFERENCE TO RELATED APPLICATIONS

This application is a divisional application of U.S. application Ser. No. 10/374,060 filed Feb. 27, 2002 now U.S. Pat. No. 7,021,572 and is a continuation application under 35 U.S.C. § 120 of PCT/CH00/00461, designating the United States, filed 30 Aug. 2000, the disclosures of which are hereby incorporated herein by reference in their entireties.

BACKGROUND

The present invention relates to a process for warm dehulling soya beans and other bean fruits and subsequently grinding them, as well as an installation for carrying out said process.

The warm dehulling of soya or other bean fruits, for example in preparing subsequent grinding, is known in general. DE-C-3544387 describes such a dehulling process, in which the fruit are heated through to the core at a certain temperature, are next subjected to a hot gas flow followed by removal of the hulls. The fruit are heated through at 50° C. to 75° C. at least partially by means of contact heat. The temperature in the gas flow is raised to 90° C.

The fruit are subjected to the contact heat in a device with hot surfaces, and to the hot gas flow on the other hand in a fixed or fluidised bed. The dehulling device can be a baffle dehuller downstream of which another fluidised bed and/or a pneumatic sifter for removing hulls can be connected. Conditioning is carried out prior to grinding.

In a known, two-step grinding procedure, a first rough grinding step employing a pair of serrated rollers, followed by a pair of rubber rollers, is followed by a reducer and this is followed by a second rough grinding step employing two pairs of serrated rollers.

SUMMARY

The present invention is directed to a process for warm dehulling of soya bean fruits or similar fruits or products, which avoids the disadvantages of the prior art and enables the process to be carried out in a simplified manner.

An installation is provided for carrying out the process. A device is also provided for dehulling the fruit and removing the hulls (hull separator).

An exemplary process enables greater efficacy with fewer procedural steps. Conditioning and heatshock of soya or other bean fruits are followed by rough-grinding in a double-grinding unit and individualising on a baffle plate, followed by separation of the hulls with aspiration. A fine grinding procedure can follow this step.

The process enables a protein-rich meal (47% to 48%, depending on the protein content in the beans) to be produced.

BRIEF DESCRIPTION OF THE DRAWINGS

The invention will now be described hereinbelow in greater detail in an embodiment with reference to a diagram, in which.

DETAILED DESCRIPTION OF THE PREFERRED EMBODIMENT

Figure 1:
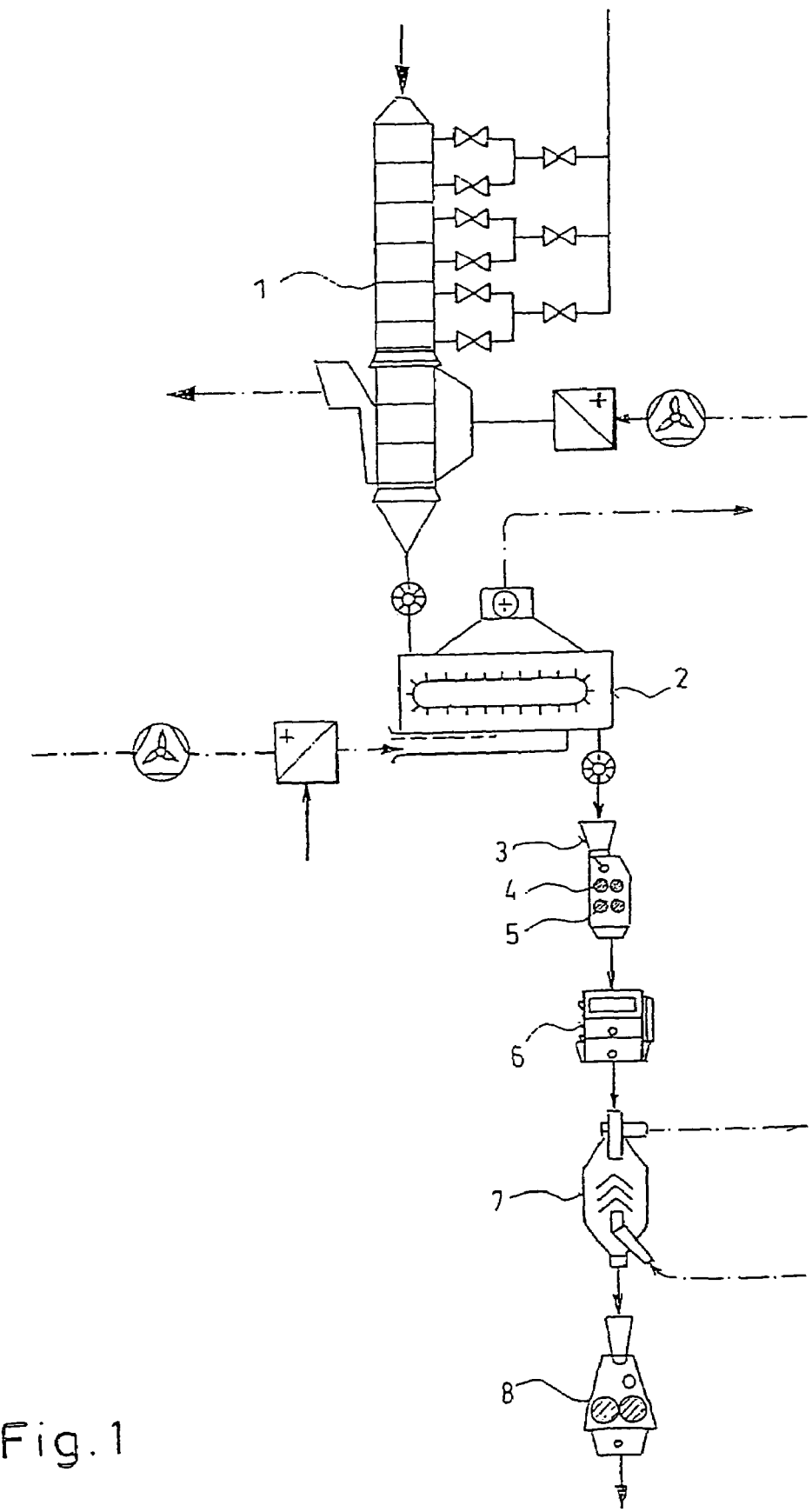
FIG. 1 illustrates a diagram of an exemplary process of an installation for warm dehulling and grinding soya or the like, FIG. 2 illustrates a cross-section of an exemplary hull separator.

In the following embodiment only the essential procedural and installation components are to be described in greater detail. Other associated procedural steps and installation components will emerge naturally from FIG. 1 with reference to the known prior art.

Whole soya beans enter steaming apparatus 1 and then a fixed or fluidised bed 2 for conditioning, as described for example in DE-C-3544387. The soya beans are heated in the steaming apparatus 1 by means of contact heat and in the fluidised bed 2 they are subjected to continuous heating in a hot gas flow at an average temperature of 70° C. to 90° C. On completion of heating the beans have a moisture content of 10-11% Hulls which are already loosened are separated from the beans both in the steaming apparatus 1 and in the fluidised bed 2 in a known manner.

The beans prepared enter a heating receptacle, not illustrated here, (interim depot) or directly enter a rough-grinding roller frame 3. This rough-grinding roller frame 3 contains two directly superposed roller pairs 4, 5 which create a double-grinding step, as described for example in EP-C-335925. The roller pairs 4, 5 display serrated rollers.

The ground beans then reach a baffle individualizer 6 and then a hull separator 7, where the hulls are completely separated from the broken beans. The separated hulls can be subjected to further sifting in an air stream. This is then followed by a device for flaking in a flaking mill and/or continued grinding in a fine milling device.

Figure 2:
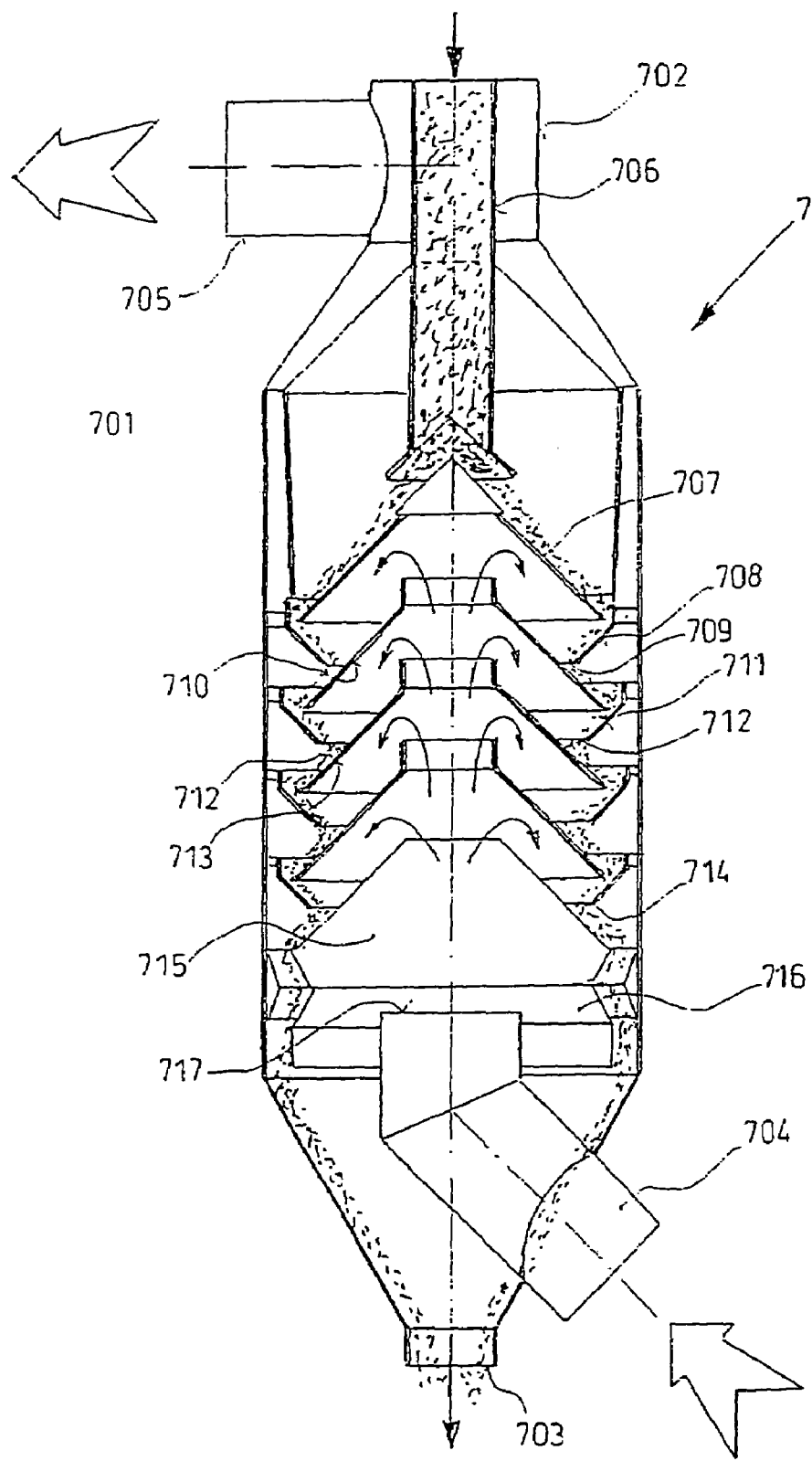

Referring to FIG. 2, the hull separator 7 comprises a substantially cylindrical housing 701 having an upper material inlet 702 and a lower material outlet 703, as well as a lower gas inlet 704 and an upper gas outlet 705 for passing the crushed beans through in the countercurrent. In the process the beans are not only aspirated, but all loose hulls are also carried away in the gas stream.

The material inlet 702 contains a delivery chute 706 via which the beans (and hulls) impact a first conical baffle 707 arranged concentrically to the delivery chute 706 in a circular manner. Loose hulls and light particles are taken away by the gas stream flowing in the opposite direction. On the other hand the bean constituents roll down the conical surface of the baffle 707 and fall into an underlying hopper 708. Projecting into the open floor 709 of the hopper 708 is another underlying conical baffle 710. Due to the effect of gravity the beans and hull constituents roll from hopper 708 onto the conical surface of the second baffle 710 and from there into the other underlying hopper 711. In the process other hull constituents can be removed with the gas flow.

Projecting underneath this hopper 711 into the floor 712 of the second hopper 711 is another such baffle 713. A third and fourth baffle follow in a similar manner. The fourth baffle 713 has a similar hopper with an open floor 714. A fifth conical baffle 715 protrudes into this floor 714, as described hereinabove. This displays beneath its conical surface a cylindrical jacket surface 716, such that this baffle 715 covers the concentrically arranged opening 717 of the gas inlet 704.

Only baffle 707 exhibits a closed conical baffle surface, as compared to the tips of the upper baffles which are open at the top to enable the gas to flow through in the direction of the hopper and the overlying baffle.

The conical opening of the delivery chute 706 or parts of the delivery chute 706 can be height-adjusted to the baffle 707 (or the baffle also) in order to regulate the influx of beans as required.

Highly efficient aspiration of the bean goods and efficient separation of the hulls is achieved by this cascading impacting arrangement. At least two, three or more baffles can be provided in exemplary embodiments.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A process for dehulling of bean fruits, comprising:
    warming the bean fruits;
    grinding the bean fruits to loosen hulls attached to the bean fruits by means of one double-milling step;
    directing the bean fruits to a baffle plate to separate the hulls from the bean fruits and create a mixture of bean fruits and separated hulls; and
    concurrently with separating the hulls from the bean fruits aspirating the bean fruits to remove the separated hulls from the mixture.

2. The process as claimed in claim 1, comprising:
    flaking or fine grinding the bean fruits following aspiration.

3. The process as claimed in claim 1, wherein two-step rough-grinding takes place during the double-milling.

4. The process as claimed in claim 1,
    wherein aspiration comprises passing a gas flow through the mixture of the ground bean fruits and hulls in a countercurrent for hull separation; and
    the removal of the hulls from t1he mixture is performed by a cascading impacting effect of the mixture, and the aspiration.

5. The process as claimed in claim 1, wherein the warming is performed by contact heat and/or in a hot gas flow.

\* \* \* \* \*